May 5, 1964 S. SOMOGYE, JR 3,131,479
LINEAL MEASURING APPARATUS
Filed March 15, 1962 7 Sheets-Sheet 4

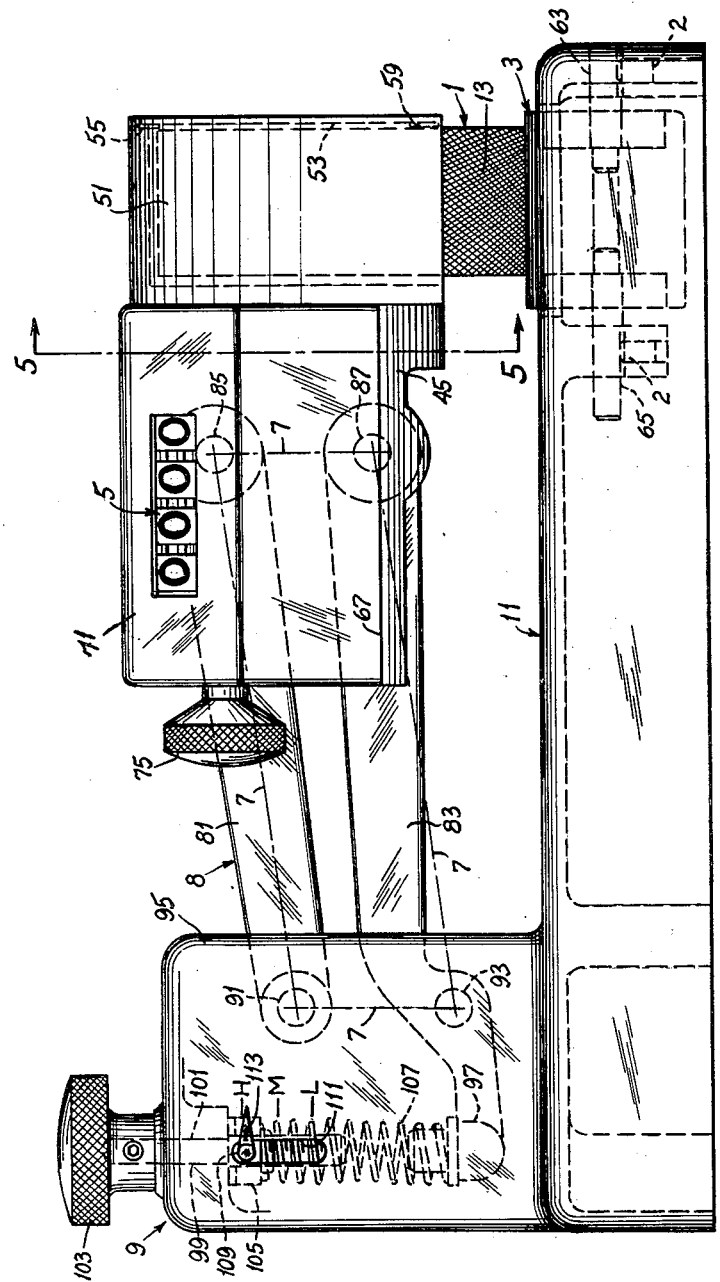

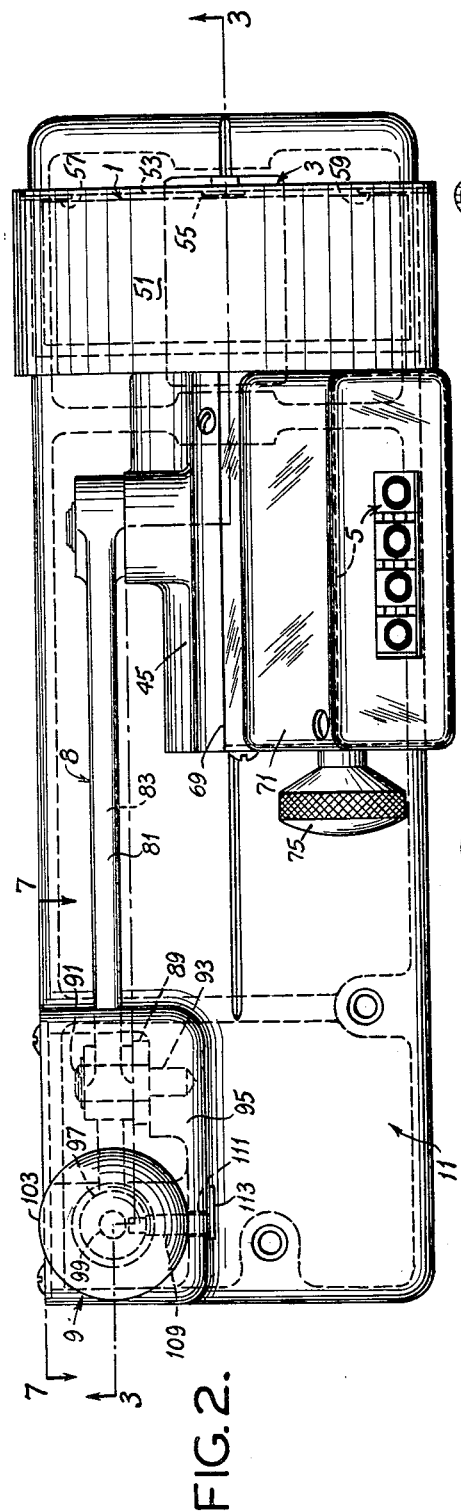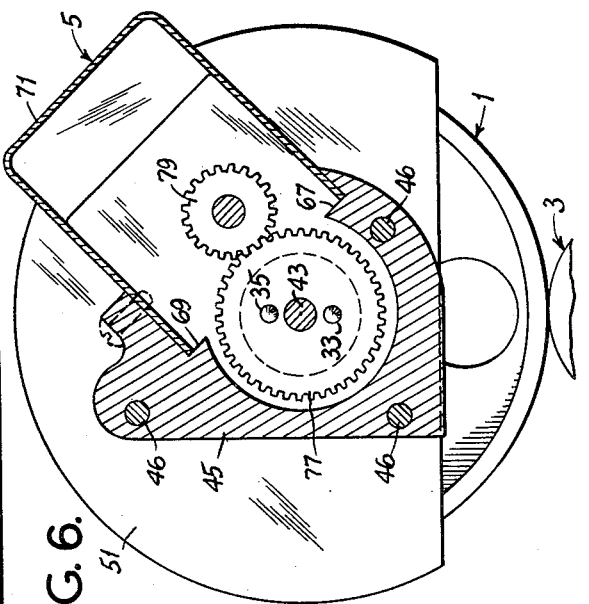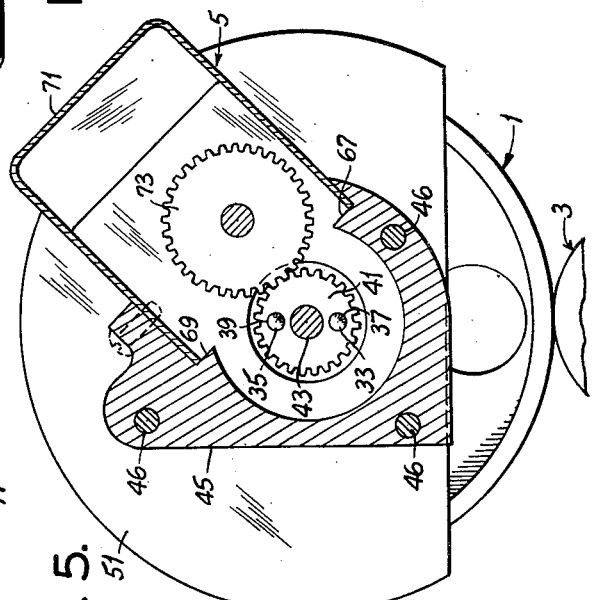

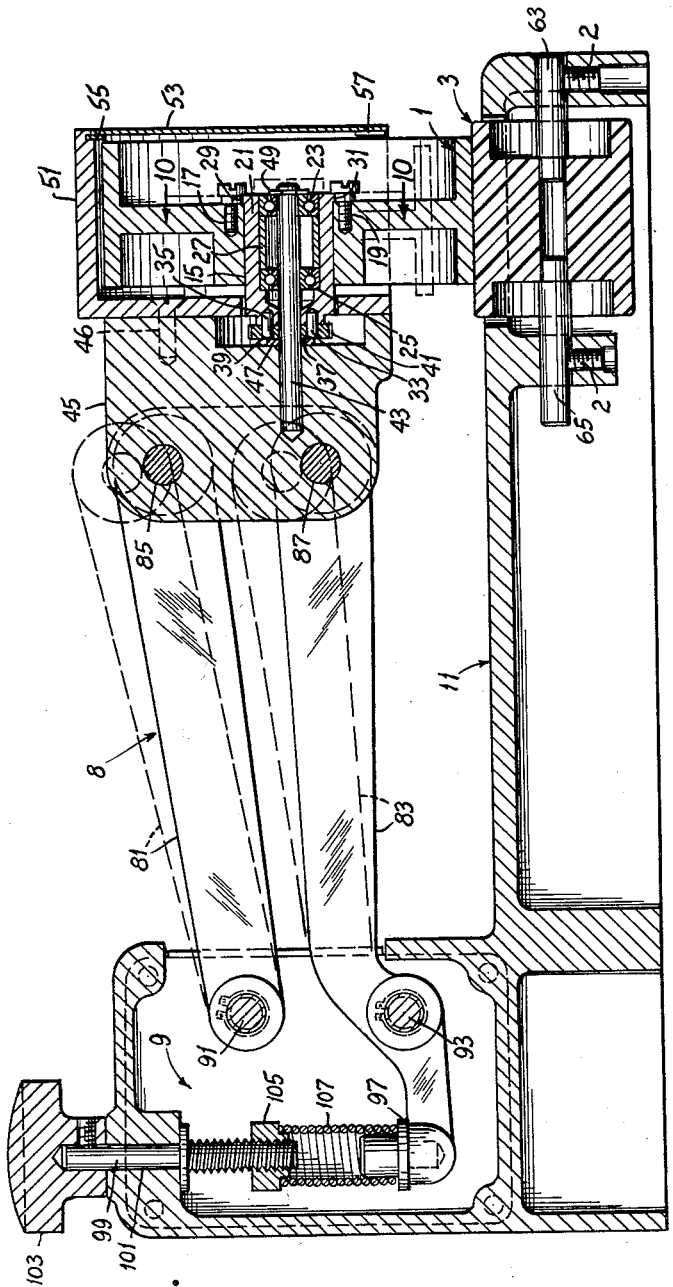
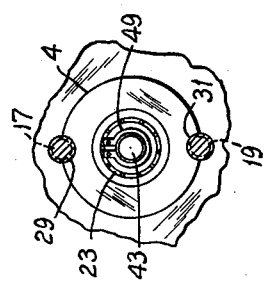
FIG. 3.
FIG. 10.

May 5, 1964  S. SOMOGYE, JR  3,131,479
LINEAL MEASURING APPARATUS
Filed March 15, 1962  7 Sheets-Sheet 5

United States Patent Office
3,131,479
Patented May 5, 1964

3,131,479
LINEAL MEASURING APPARATUS
Steve Somogye, Jr., Jennings, Mo., assignor to The Measuregraph Company, St. Louis, Mo., a corporation of Delaware
Filed Mar. 15, 1962, Ser. No. 182,153
18 Claims. (Cl. 33—129)

This invention relates to lineal measuring apparatus, and more particularly to a lineal counter or measuring apparatus for measurement in appropriate units and fractions thereof, of strips, wires, strands or the like, lengths of various materials such as cloth, paper, metal and other types of material adapted for lineal measurement.

This application is continuation-in-part of my United States patent application Serial No. 53,418, filed September 1, 1960, now abandoned for Lineal Measuring Apparatus.

Among the several objects of this invention may be noted the provision of a lineal counter which will give an accurate lineal measurement of material adapted to be lineally measured, whether rough or smooth; the provision of a lineal counter having minimal or no bounce between its rolls; the provision of a lineal counter wherein the center lines of measuring and contact rolls at all times remain in the same or vertical plane so that the measuring roll and the contact roll are properly aligned; the provision of a lineal counter having a measuring roll which can be easily adjusted to accommodate materials having different degrees of compressibility and thicknesses without misalignment of the measuring roll and the contact roll or damage to the material; the provision of a lineal counter adapted for lineal measuring in different units of length such as feet or yards, the converversion therebetween being easily accomplished; the provision of a lineal counter having means for adjustably setting the axis of the measuring roll parallel to the pass plane of the measuring roll and backing roll; and the provision of a lineal counter which is simple and economical in construction and reliable in operation. Other objects and features will be in part apparent and in part pointed out hereinafter.

The invention accordingly comprises the construction hereinafter described, the scope of the invention being indicated in the following claims.

In the accompanying drawings, in which several of various possible embodiments of the invention are illustrated, FIG. 1 is a view in side elevation of a lineal counter made according to the invention;

FIG. 2 is a plan view of FIG. 1;

FIG. 3 is a vertical section taken on line 3—3 of FIG. 2, but with a contact pressure adjusting mechanism being shown in a different position than in FIG. 1;

FIG. 5 is an enlarged vertical section taken on line 5—5 of FIG. 1, showing a gear train used in measuring in yards;

FIG. 6 is an enlarged vertical section similar to FIG. 5, showing a gear train used in measuring in feet;

FIG. 10 is a vertical section taken on line 10—10 of FIG. 3;

FIG. 15 is a fragmentary view similar to FIG. 14, showing an open position of parts;

FIG. 17 is a horizontal jogged section taken on line 17—17 of FIG. 11.

Corresponding reference characters indicate corresponding parts throughout the several views of the drawings.

Figure 4:
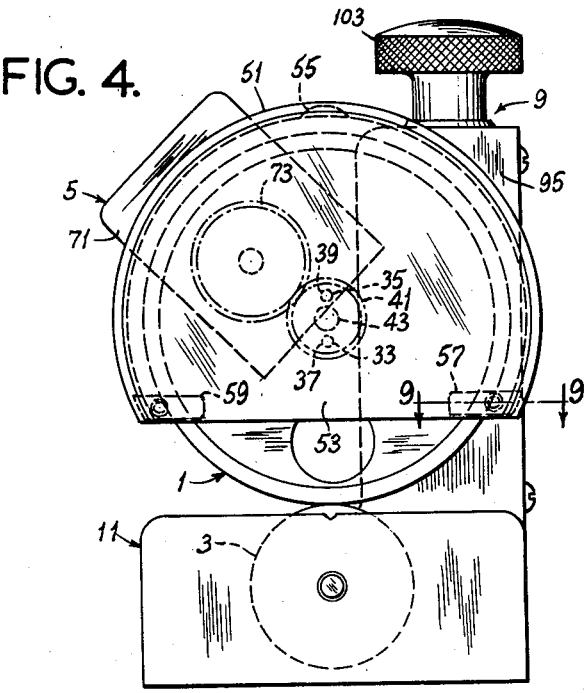
FIG. 4 is a right-end view of FIG. 2.
Figure 9:
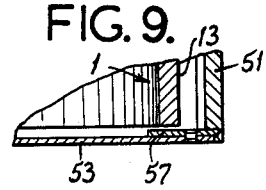
FIG. 9 is a fragment of FIG. 4 shown in section, being taken on line 9—9 of FIG. 4.
Figure 7:
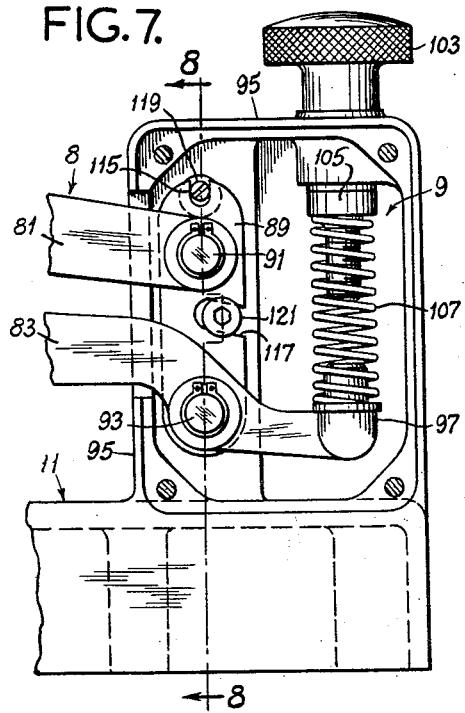
FIG. 7 is a fragmentary vertical section taken on line 7—7 of FIG. 2.
Figure 8:
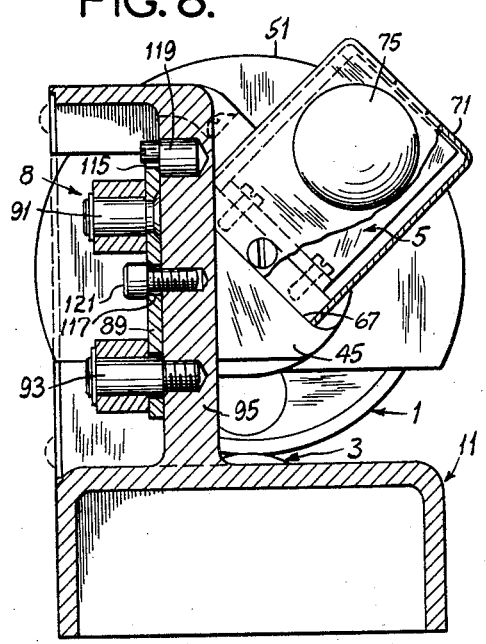
FIG. 8 is a vertical cross section taken on line 8—8 of FIG. 7.

One former method of lineal measurement of cloth, paper and other materials adapted for lineal measurement, was accomplished by a device having a measuring roll rotatably mounted on a swinging arm, pivotally attached to a fixed bar. The arm extended from the pivot in the direction of movement of the material under measurement. A counter was arranged to respond to the revolutions of the measuring roll. The arrangement was such that the measuring roll would rest on a backing member, such as a table, or on another freely rotatable roll, called a contact roll. A material to be measured, for example, a bolt of cloth, was pulled in a lineal direction between the nip of the measuring roll and the table or contact roll, causing the measuring roll to rotate. The circumference of the measuring roll was such that for every revolution of the measuring roll the counter would register the number of units of length and fractions thereof, corresponding to the circumference of the measuring roll. When the desired length of cloth was obtained, as could be observed by reference to the counter, the operator would stop pulling the cloth and cut it. The arm carrying the measuring roll and the counter at one end being pivoted allowed the measuring roll to move to accommodate different thicknesses of material to be measured.

There are several disadvantages to this type of lineal counter or measuring apparatus. When the material is being pulled rapidly through the nip of the measuring roll and the contact roll, the measuring roll tends to bounce out of contact with the material so that a portion of the material will pass between the measuring roll and the contact roll without being measured. Consequently more material was pulled through the rolls than the amount indicated by the counter, resulting in inaccurate measurements and a loss to the seller. While the error for each bounce might be small, nevertheless when multiplied by the number of bounces occurring during the measuring process, might become significantly large.

This error due to bounce would become even more pronounced when measuring materials having a greater thickness than, for example, paper, and more particularly thick resilient materials such as rubber tape. As the thickness of the material increased, the distance between the peripheries of the measuring roll and the contact roll increased. Since the measuring roll was carried on a pivotal arm, the plane of the common center lines of the rolls, i.e., a plane passing through the axis of each roll, would move to an inclined position with respect to the normal vertical plane of the common center lines, causing misalignment of the rolls. As the material being measured passed through the nip of the rolls, it would always be in contact with the peripheries of the rolls, at least at points in the plane of the common center lines. If, for example, the contact points in the plane of the common center lines moved forward when a relatively thick material was being measured, the material would come in contact with the contact roll at the uppermost points thereof and then curve forwardly around a portion of the periphery of the contact roll to points which fall in the plane of the common center lines. Thus, a forward thrust on the measuring roll would be created by the material when pulled through the rolls. This thrust would be in such a direction as to aid in creating the bounce of the measuring roll and any resiliency in the material further accentuated the bounce.

Further, the pressure applied by the measuring roll and the backing member to the material passed therebetween was constant, providing no adjustment in pressure for materials having different degrees of compressibility. As a result, very compressible materials, such as foam rubber, were sometimes damaged by the pressure applied thereto. These machines also had no provision for maintaining satisfactory degrees of accuracy of measurement of materials having a rough face. In some former machines the counter was driven by the stationary roll and in others the movable roll was mounted in straight guides. In none of them were all of the defects above-mentioned avoided.

FIGS. 1-10 illustrate one form of the invention. The device includes a measuring wheel member or first roll 1, a second backing member or contact roll 3, a counter generally designated as 5, a parallel four-bar linkage generally indicated at 8, a contact pressure adjusting mechanism generally indicated at 9, and a base 11.

The measuring roll 1 is provided with a knurled peripheral surface 13, the effective circumference of which is, for example, exactly one foot. The measuring roll 1 is provided with a central bore 15 and two diametrically opposed holes 17 and 19 having threaded interiors. A cup-shaped bearing housing 21 is mounted within central bore 15, and houses two ball bearings 23 and 25 separated by spacer 27. A flange 4 located at one end of the bearing housing has semicircular cutout portions 29 and 31 (FIG. 10). Two screws threaded into holes 17 and 19 of measuring roll 1, have shoulder portions which register with the cutout portions 29 and 31 of the housing and serve to hold the housing keyed within the central bore 15. The inner races of the bearings 23 and 25 are carried on a fixed shaft 43 extending from a counter support 45. Two pins 33 and 35 extend from the other end of the housing. These pins register with holes 37 and 39 located in a gear 41 rotatably mounted on shaft 43. The shaft 43 carries a washer 47 between the counter support 45 and the gear 41. The bearing assembly is kept within the bearing housing 21 by means of a snap ring 49 applied to a groove in the shaft 43. Thus the counter support 45 also supports the measuring roll 1.

A measuring roll housing 51 surrounds the measuring roll assembly and is attached to the support 45 by screws 46. Cover plate 53 fits over the end of the measuring roll housing 51 and is secured thereto by means of a circular retainer 55 and two latch members 57 and 59. When the inner ends of the latch members 57 and 59 are pushed upwardly (as viewed in FIG. 4), the outer edges thereof will wedge into grooves formed in the measuring roll housing 51 (see FIG. 9). By the use of these latch members the cover plate may be retained on the measuring roll housing without any disfigurating retaining means located on the outside of the cover plate or measuring roll housing, thus giving a clean appearance thereto.

The contact roll 3 is preferably composed of nylon or a similar material and is supported below the measuring roll on pins 63 and 65. These pins are fixed within holes in the base 11 by any convenient means, such as set screws 2. The contact roll 3 may be easily removed from the base 11 should a user have need for another contact roll.

A conventional counter 5 (adapted to register one unit upon two revolutions of the input shaft 6) thereof, is seated on the shoulders 67 and 69 of counter support 45. The counter may be a 1000 unit counter. A cover 71 is placed over the counter and attached to the counter support 45. A gear 73 in mesh with gear 41 is attached to the input shaft of the counter. As shown in FIG. 5, the speed ratio of the gear 41 to gear 73 is 3:2, so that for every three revolutions of gear 41, gear 73 will make two revolutions and one unit will be registered by the counter. Since the circumference of the measuring roll is one foot, the gear train is such that one unit will be registered by the counter for every three revolutions (covering one yard in linear measurement) of the measuring roll. A conventional counter reset knob of the counter is shown at 75 for resetting the counter to zero when desired. It will be noted that the counter is set in support 45 at an angle of approximately 45 degrees, thereby permitting the operator to easily view the numerals.

An alternate gear train arrangement for measurement in feet is shown in FIG. 6. In this embodiment the gears 41 and 73 are merely replaced by gears 77 and 79, respectively, without making any changes in the remainder of the machine. The speed ratio of gear 77 to 79 is 1:2 so that for every one revolution of gear 77, gear 79 will make two revolutions and register one unit on the counter. Since the gear 77 and the measuring roll 1 will make one revolution every time one foot of material passes through the nip of the measuring roll and the contact roll, the counter will register one unit for each foot of material. A purchaser of the machine may be supplied with a full set of gears so that he may select either unit of measure.

The parallel four-bar linkage 8 comprises an upper link or arm 81 and an opposed lower link or arm 83. Link 81 is pivoted at a free end to fixed pin 85 extending from the counter support 45. Link 83 is pivoted at a free end to fixed pin 87 also extending from the counter support 45. The member 45 also supports roll 13 and forms one link 45 of the parallel-four-bar linkage 8. The upper arm 81 by means of a pin 91 is pivoted at its other end to a pivotally mounted locating link or plate 89 (see FIGS. 7 and 8). This link 89 of the parallel-four-bar linkage 8 is in opposed position to link 45. The lower arm 83 is pivotally mounted on a pin 93, which pin is fixed to the upright housing 95. The pin 93 also serves as a pivot point about which locating plate 89 may be pivoted. Lower arm 83 has a portion thereof extending past pivot pin 93, on the end of which portion is mounted a spring rocker cap 97.

As shown in FIG. 1, lines joining the pivot points of the arms 81 and 83 form a parallelogram 7. It will be seen that any movement imparted to the measuring roll 1 in an upwardly direction will be such that its axis moves parallel to itself and in a vertical plane passing through the axis of the roll 3. Thus, if the axis of the measuring roll is arranged to be parallel to the pass plane of the measuring roll and the contact roll the structure will keep the axis of the measuring roll 1 in that condition, regardless of the elevation of roll 1 above roll 3 as required by the thickness of the material being measured.

The contact pressure adjusting mechanism 9 includes an adjusting or backstopping stud 99 extending through a hole 101 in the top portion of housing 95. An adjusting knob 103 is attached to the upper end of stud 99 on the outside of the housing 95 by any convenient means, as for example, by a setscrew. The upper portion of stud 99 is smaller in diameter than the lower portion 100 thereof. The lower portion 100 of the stud 99 has a left-hand double thread, the upper portion of which thread abuts a case hardened washer attached to the inside of housing 95. A nut or backstop 105 having a left-hand double thread is in engagement with the threaded portion of the stud 99. A coiled compression spring 107 is located between a shoulder on spring rocker cap 97 and a shoulder on nut 105 for a given adjustment. A selector pin 109 is attached to nut 105 and extends forwardly through a vertical slot 111 in the front of housing 95 and has a pointer 113 on the end thereof pointing in a horizontal direction. Three designations, H, M and L, are located on the front of the housing 95 and represent high contact pressure, medium contact pressure and low contact pressure, respectively.

It will be seen that when the adjusting knob 103 is turned clockwise (as viewed in FIG. 2) the nut 105, the selector pin 109 and the pointer 113 will move in a downwardly direction from the position shown in FIG. 1 towards the position shown in FIG. 3. As the nut moves downwardly on adjusting stud 99 a varying pressure is exerted on the end portion of arm 83 by yieldable spring 107, biasing the parallelogram structure 8 to pivot upward about pins 91 and 93, thereby offsetting more or less of the overhanging weight associated with structure 8. Upon extended downward movement of the nut 105 the counter and the measuring roll 1 will rise upwardly, while the axis of the measuring roll remains parallel to the pass plane of the rolls. Due to the weight of the counter and other structure located on the outer ends of arms 81 and 83, the measuring roll will have a tendency, due to gravity, to remain in or fall towards its lowermost position. The effect of the gravitational force is diminished and may be overcome by the force of spring 107 as the nut 105 moves downwardly on the stud 99. The dotted-line position of parts in FIG. 3 suggests the direction in which downward adjustments of nut 105 tend to push the links 45, 81, 83. Thus various contact pressures are available for materials of various thicknesses.

As mentioned previously, the locating plate 89 is pivotally mounted on pin 93. The locator plate has a slot 115 at the upper end thereof and a slot 117 in the side thereof. An eccentric pin 119 is mounted in the housing 95 and has a small finger extending through the slot 115. The eccentric pin 119 is freely rotatable within the housing 95 and by merely rotating the finger thereof which extends through slot 115, the locator plate 89 may be adjustably pivoted left or right about pivot pin 93. A cap screw 121 extending through the slot 117 and into the housing 95 functions to lock plate 89 in any selected position.

Reductions in time and labor costs are obtained by the provision of the locating plate. If the locating plate were not incorporated in the present invention holes adapted to receive pins 91 and 93 would need to be exactly positioned in the housing 95 to insure that the axis of the measuring roll is aligned with the axis of the roll 3. Such exactness would take time and increase the labor cost incurred in assembling the lineal counter. Should the holes fail to be exactly positioned, misalignment of the measuring roll and the backing member would result. By the use of the locating plate any initial inexactness of the holes for receiving pin 93, pin 119 and cap screw 121 may be compensated for by properly locating the plate 89.

When assembling the apparatus the locator plate 89 is pivoted about pin 93 until the axis of the measuring roll is parallel to the axis of the contact roll. The plate 89 is then fixed in that position by tightening cap screw 121. Also, should the axes of the rolls become misaligned, by dropping the apparatus, for example, realignment may easily be accomplished in the same way.

As previously mentioned, the letters H, M and L, represent high contact pressure, medium contact pressure and low contact pressure, respectively. When it is desired to measure a length of very firm material, such as metal, wire, etc., the pointer is set on the high contact pressure designation, thereby letting the full weight of the parallelogram linkage, the counter and the measuring roll fall on the contact roll with little or no inhibiting force by the spring 107. If it is desired to measure length of material such as woolens, soft cloth or other slightly compressible materials, which are normally slightly thicker than metals and other firm materials but which might be damaged by the application of a large pressure thereto, the pointer is set on the medium pressure contact designation. This tends to lift the measuring roll from the contact roll in a vertical direction and permits a portion of the gravitational force to be opposed by the force exerted by the spring 107. This adjustment will make it possible to pull material through the nip of the measuring roll and the contact roll without being damaged due to the weight exerted by the measuring roll thereon. If it is desired to measure a length of thicker and very compressible material, such as foam rubber or the like, which material can be very easily damaged by too much compression, the pointer is set on the low contact pressure designation, thereby tending to raise the measuring roll off the contact roll and allowing the gravitational force to be opposed or overcome by a substantial force created by spring 107.

While it has been stated that metals and other firm materials which are normally thinner than woolens or foam rubber and similarly medium firm materials such as woolens, which are normally thinner than foam rubber, may be measured by this machine, it is to be understood that the thickness of the materials being measured is not the predominant factor which determines the setting at which the pointer should be placed, but rather the firmness of the material predominates. Thus, any available contact pressure may be used for any thickness of material within the range of the device.

When it is desired to measure a length of material, the operator merely selects the proper contact pressure for the firmness of the material to be measured, and turns the adjusting knob 103 until that setting is obtained. He then inserts the material between the nip of the measuring roll 1 and the contact roll 3, and pulls the material therethrough. Assuming the gears incorporated in the gear train are of the type shown in FIG. 5, i.e., adapted for measuring material in yards, the counter will measure progressively up to 1, in one-eighth unit increments, as the measuring roll rotates three times. If ten and one-half yards of material are desired, for example, the operator merely pulls the material through the nip of the measuring roll and the contact roll until "10⅛" appears on the counter. The operator can then cut the material at the desired point. The operator may rapidly pull any thickness of material through the nip of the measuring roll and the contact roll and need not be concerned about the measuring roll bouncing out of contact with the material. If the next material to be measured is, for example, very compressible and also of a greater thickness than the previous material, the operator merely changes the pressure contact to the required setting, and proceeds to measure the material in the same manner.

If it is desired to change the measuring units from yards to feet, the operator merely unlatches the latching members 57 and 59, removes the cover plate 53, removes the snap ring 49, withdraws the measuring roll 1, the bearing housing 21, and the ball bearings 23 and 25, all as a unit, removes housing 51, and then removes gears 41 and 73. He then replaces gears 41 and 73 with gears 77 and 79, respectively. The remainder of the structure is then reassembled in reverse of the manner it was disassembled.

Should it be desired to change the unit of measure to a metric system, the appropriate measuring roll, gear train, and counter may be obtained and installed in this machine.

Referring now to FIGS. 11–17 of the drawings, there will be described an alternative arrangement useful for measuring rough-surfaced materials (as well as others) wherein the counter is mounted on the base and driven by a stationary roll, the back-up roll having a soft surface and being carried on the parallel-motion mechanism, thus providing a high degree of accuracy of measurement. The alternative construction also includes an antispin device, as will appear.

As shown in FIGS. 11–17, some of the parts are identical in function with corresponding parts above-described in connection with FIGS. 1–10, although in some instances somewhat different in shape. In order to avoid repetitious verbal description, such parts will, for purposes of identification, be given the same numbers but primed, whether or not the shapes are identical. New unprimed designations will be employed for parts which are not shown in FIGS. 1–10 or which are differently organized.

In this form of the invention the counter 5', instead of being movably supported, is carried on a bracket 125 which is attached to a forward hollow extension 127 formed on the housing 95'. The counter 5' is provided with a reset lever 75', which corresponds in function to that of the reset knob 75 shown in the FIGS. 1–10 form of the invention, namely, to reset the counter to zero as desired, in known manner.

The housing contains the parts (not shown again in FIGS. 11–17; but see FIG. 7) for counter-balancing and adjusting the configuration of the parallel-motion mechanism. The counter 5' has a drive shaft 129 which extends into the housing extension 127 where it is provided with a sprocket 131. Sprocket 131 has a chain 133 connecting it with a sprocket 135 carried on the end of a shaft 137. The shaft 137 is rotatably supported in brackets 139 and 141 attached to the underside of base 11'. Brackets 139 and 141 are attached by screws (not shown except in FIG. 16) and are removable with the parts supported thereby and described below.

Figure 11:
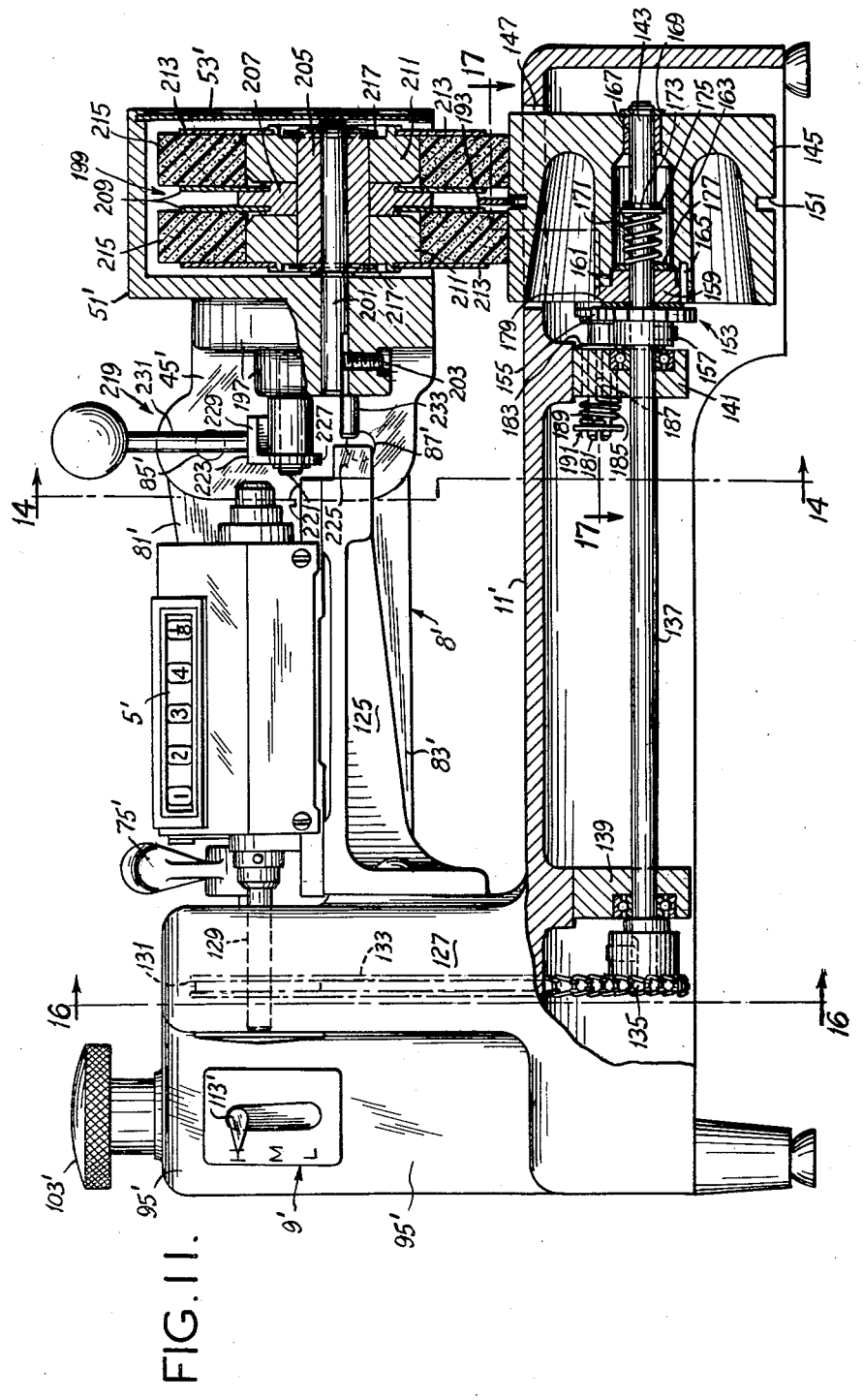
FIG. 11 is a side elevation of an alternative form of the invention, parts being broken away.
Figure 12:
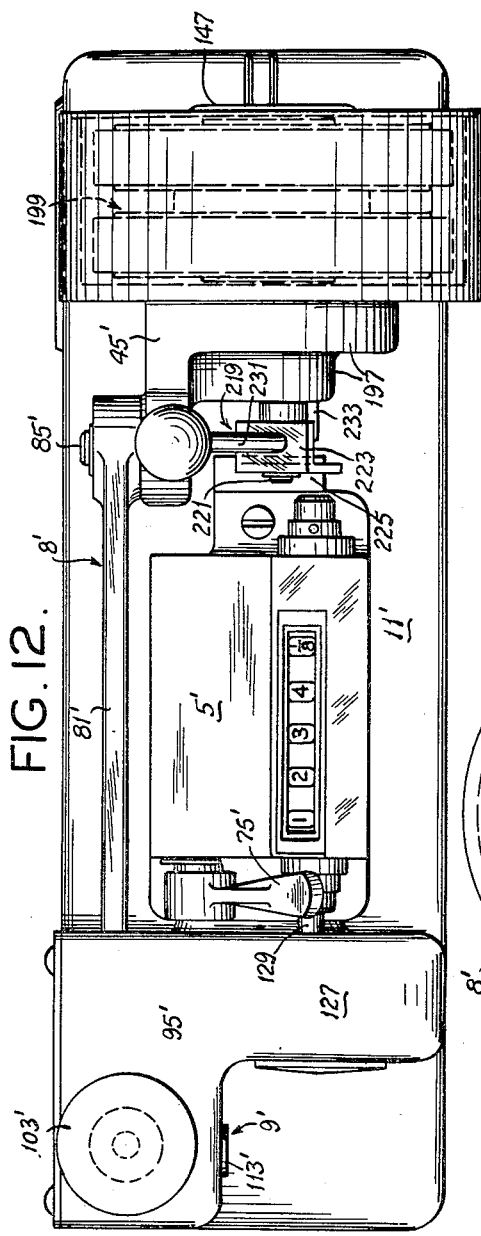
FIG. 12 is a plan view of FIG. 11.

As will be seen from FIG. 11, shaft 137 includes a part 143 which extends to the right of bracket 141. This extension 143 supports a measuring or first roll 145, the upper arc of which extends through an opening 147 in the base 11'. The roll is metallic and has an exterior hard knurled surface 149 wherein is a central groove 151 (see also FIG. 17). Roll 145 has an antispin driving connection with the shaft 137, which is numbered 153 in general. The driving connection 153 is constituted by a ratchet 155 affixed to the shaft 137 by means of a set screw 157 in its hub. At 159 is shown a clutch disc part which is freely rotatably on the shaft 137. The disc 159 is contained in a pocket 161 of a hub portion 163 of the measuring roll 145. It is also removably connected for rotation with roll 145 by pin 165. Thus the roll 145 and the disc 159 are rotatable as a unit, the disc 159 forming one bearing for this unit on the shaft extension 143. A sleeve-bearing 167 in the other end of the roll 145 forms a rotary support therefor at the other end of the shaft extension 143. A snap ring 169 prevents movement of the roll 145 from the right-hand end of the extension 143. By removing snap ring 169, the roll 145 may be disassembled from the disc 159 and shaft extension 143, leaving pin 165 in the disc. Thus parts to be described on extension 143 may be organized prior to assembly of roll 145 (or reached for repair) by roll removal after assembly.

Coiled around the shaft extension 143 is a compression spring 171 which reacts from a washer 173, held in place by a snap ring 175 located in a groove in the extension 143. The other end of the spring engages a washer 177 which slides on extension 143 and is forced by the spring 171 against the disc 159. A friction washer 179 is located between the disc 159 and the adjacent side face of the ratchet 155. Thus the spring forces the disc 159 toward the side of ratchet 155, the washer 179 forming a frictional connection therebetween. Therefore, as long as the ratchet 155 is free to rotate, so also is the measuring roll 145, so as to drive shaft 137. As a result, if the measuring roll 145 is turned, as by a moving strip of material engaging it, the shaft 137 will be turned and the counter 5' will be driven to register the length of material passing over the roll. This measures its length.

Figure 13:
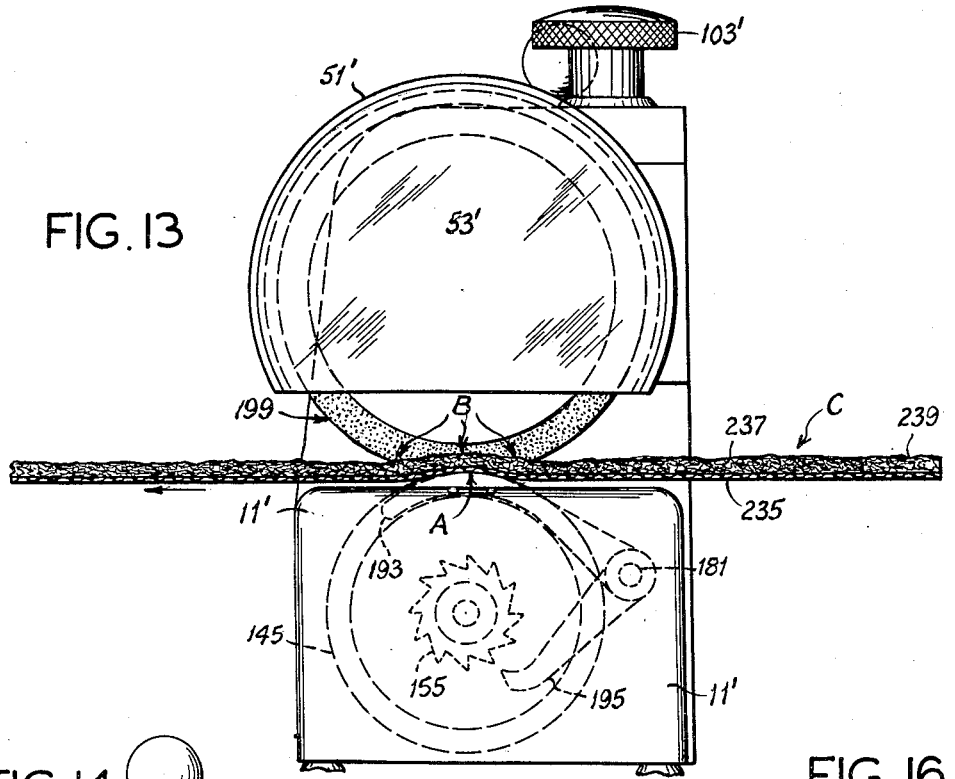
FIG. 13 is a righ-end elevation of FIGS. 11 and 12, showing a rough-surfaced strip under measurement.
Figure 14:
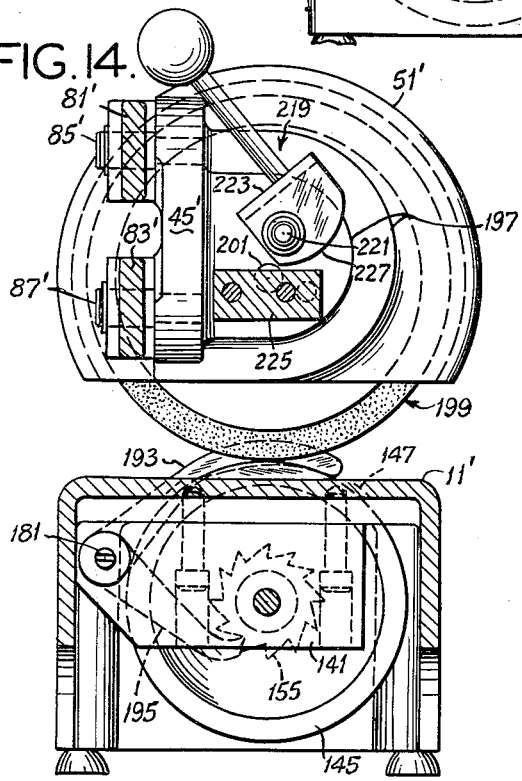
FIG. 14 is a cross section taken on line 14—14 of FIG. 11, showing a closed position of parts.
Figure 16:
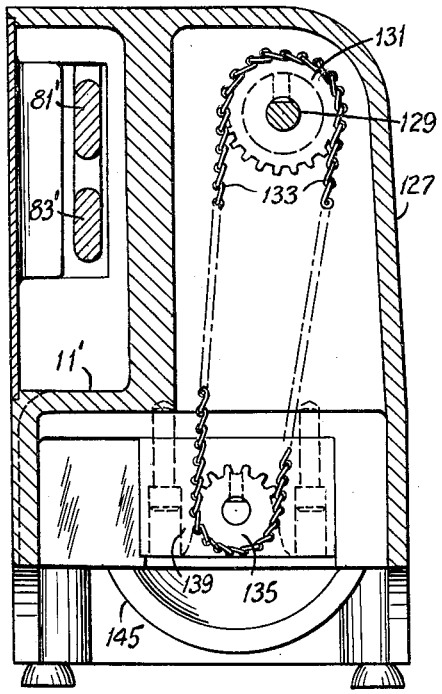
FIG. 16 is a cross section taken on line 16—16 of FIG. 11.

FIGS. 11, 13, 14 and 17 show a ratchet-holding and releasing mechanism as follows: Rotatably borne in the bracket 141 is a pin 181, axially held in place on one side of the bracket by means of a snap ring 183 in a groove of the pin. On the other side of the bracket is a coil spring 185, one end 187 of which is anchored in the bracket and the other end 189 of which is anchored to the pin 181 (see the combination slot and snap ring fastener 191). Attached to the pin 181 is a detector finger 193 and also a pawl 195 for the ratchet 155. Members 193 and 195 are angled as shown in FIG. 14. The finger 193 is located in the plane of the roll groove 151, and may move in and out of the same.

Upon assembly, the spring 185 is wound so as to turn the pin 181 in bracket 141 in a direction to lightly bias the finger 193 out of the groove 151 and to place the end of the pawl 195 into engagement with the ratchet 155, as shown in FIGS. 11, 14 and 17. When the finger 193 is pushed into the groove 151, the end of the pawl 195 is out of engagement with the ratchet 155, as shown in FIG. 13. Under such a condition, the measuring roll 145 then drives the shaft 137 through the friction clutch, the latter being constituted by clutch-forming members 159, 179 and the flat side of ratchet 155. These clutch parts are spring-pressed together by the spring 171. The torque transmitted by the clutch parts is sufficient to drive the counter 5' through drive 137, 135, 133, 131, 129. When the finger 143 is biased out of the groove 151 and the pawl 195 engages the ratchet 155, this drive is locked. But under such conditions the measuring roll 145 may continue to rotate, thus slipping the clutch. Then the roll 145 will be gradually braked to a stop. Note in this connection the pin connection 165 between the roll 145 and the disc 159.

Referring now to the parallel-linkage member 45' (which is the equivalent of the member 45 in FIGS. 1–10), it is formed with a stepped part 197, from which extends the housing 51' having the removable end cover 53', the latter being held in place as already described and requiring no further description. In this form of the invention, the housing 51' and cover 53' contain a novel back-up roll assembly which is in general numbered 199. This backing roll assembly is supported upon a pin 201 affixed in the part 45' by a set screw 203.

The back-up or second roll assembly 199 comprises a hub-forming sleeve 205 which is rotatable on the extension of the pin 201. Surrounding the central portion of the hub 205 is a laterally stepped disc 207 carrying annular plates 209 which are staked or otherwise fastened thereto. Surrounding the ends of the hub 205 and flanking the ring 207 are identical but reversed rings 211, having end collars to which are staked or otherwise fastened annular plates 213. Rings 215 are sandwiched between each pair of ring-shaped plates 209, 213. Spaced rings 215 are composed of spongy soft material such as a highly deformable and resilient foam plastic (Styrofoam, for example), foam rubber or the like. The soft margins of the rings 215 extend from the circular edges of the plates 209, 213. The rings 207 and 211 are stacked on and around the hub 205 and held together by spring snap rings 217, located in grooves in the ends of sleeve 205. Thus the assembly constituting the backing roll 199 is freely rotatable on the pin 201 extending from the member 45'.

Depending upon the adjustment of the contact pressure mechanism 9', as determined by the adjusting knob 103, there will be more or less tendency of the backing roll assembly 199 to descend by gravity and press against the measuring roll 145, with resultant deformation. To prevent the soft peripheries of the rings 215 from taking a set by contact with roll 145 when the device is idle, a lifter mechanism is provided which is generally numbered 219. This mechanism consists of a pin 221 extending from the stepped portion 197 of member 45'. Rotatably mounted on the pin is a lever 223 of L-shaped cross section. Extending from the fixed bracket 125 is a lug 225. One side of the lever 223 is formed as a cam 227, terminating in a flat supporting portion 229. A control pin 231 extends from the lever 223. A stop pin 233 extending from part 197 is engageable by one side of the lever 223. This limits clockwise motion of lever 223 as viewed in FIG. 15. In this position the lever, by contact of the cam 227 on lug 225, lifts the roll assembly 199 away and clear from the measuring roll 145. In this position the lever 223 engages the stop pin 233, so that the face 229 is located flat on the lug 225. This is the position of parts for storage of the machine.

When the lever 223 is turned anticlockwise, the camming action of lever 223 on the lug 225 lets the member 45' down, so that the soft margins of the back-up roll 199 can engage the measuring roll 145. While FIG. 14 shows an osculatory engagement between the rolls, it will be understood that this corresponds to a situation in which pointer 113' of mechanism 9' is at adjustment L. Thus there is not much, if any, deformation of the soft margin of the roll 199. For other adjustments through the H and M range, substantial deformation of the margin at roll 199 would occur, as will be apparent from the following description of operation of this alternative form of the invention.

Assume that it is intended to measure a strip of material having a comparatively rough surface, this being of the type with which former measuring machines gave the least accurate measurements. For example, this might be a strip of tufted carpet, such as illustrated at C in FIG. 13. Such a carpet may have a comparatively smooth backing 235 with a rough, deep-pile facing 237. When this is fed between the rolls 199 and 145 (counter 5' set to zero and lever 223 up), the roll 199 drops by gravity. Its soft margins will deform and adjust themselves to a large area of interlocking contact with the rough contour of the face portion 237. If roll 199 were a measuring roll, a contact of this nature would result in serious error of measurement.

According to the form of the invention shown in FIGS. 14–17, the measurements are quite accurate. This is because the soft periphery of the backing roll assembly 199 has a large area B of interlocking contact with the rough surface of face 237 of the strip C. This has the effect of pressing the lower smoother part 235 of strip C into an arcuate wrapping contact at A with the hard surface of the measuring roll 145. The pitch line contact on hard roll 145 is of constant radius. This fact, taken in connection with the fact that slippage is inhibited because of the wrap-around effect of strip C on roll 145 (see A) and the interlocking effect of the soft surface on roll 199 with strip C, results in a high degree of accuracy of measurement to be counted by the counter 5'. In addition, the absence of bounce between the rolls 145 and 199 further contributes to accuracy.

The introduction of the strip C between the rolls 145 and 199 is accompanied by depression of the finger 193 into the groove 151 of the roll 149, which causes the pawl 195 to be withdrawn from the ratchet 155. Thus the shaft 137 is free to be driven by the measuring roll 145 through the clutch parts constituted by the roll-driven disc 159, washer 179 and the side of the ratchet 155. Therefore as the strip moves through the roll nip, the counter 5' is driven by the drive 137, 135, 133, 131, 129.

Assume next that the end 239 of strip C passes from between the rolls 199, 149. There will then be a tendency for the inertial effects of the roll 149 to cause it to continue to rotate or spin after the end 239 has passed the nip between rolls. Such overspinning motion, as transmitted to the counter 5', would vitiate measurement. As the end 239 leaves the nip, the finger 193 under action of the spring moves up out of groove 151, whereupon the pawl 195 engages the ratchet 155. This immediately arrests the motion of the shaft 137 without much shock. At this time clutch slippage at washer 179 permits the measuring roll 145 to overrun until it is braked to a stop. If the measuring roll 145 were to have a rigid connection with shaft 137, it would be necessary for the ratchet and pawl mechanism instantly to stop the roll also, which would result in considerable undesirable shock. By means of the clutch mechanism, in addition to the ratchet and pawl mechanism, stoppage of the counter 5' is effected without such shock.

In view of the above, it will be seen that although the form of the invention shown in FIGS. 1–10 constitutes an improvement over prior measuring apparatus, the form shown in FIGS. 11–17 is preferred, particularly for materials having rough, coarse or rugged surface contours.

It will be understood that special wire guides (not shown) may be mounted on the base of the machine to guide a wire between the rolls.

As may be seen from the foregoing description, a linear counter of this invention eliminates the troublesome and costly bounce of the measuring roll, and misalignment of the measuring roll and the contact roll, while at the same time performs a very accurate measurement of materials of various thicknesses and densities being pulled through the nip of the rolls.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Lineal measuring apparatus comprising a frame, a backing roll mounted thereon and rotatable about a first axis, a measuring roll mounted on a shaft and rotatable about a second axis movable through parallel positions in a first plane including both axes, said rolls being rotatable in a common second plane perpendicular to said first plane, a body carrying said shaft, and a parallel-four-bar linkage supporting said body of which said body constitutes one link and a portion affixed with respect to said frame constitutes another link, said linkage having relative movement of its links in a third plane perpendicular to said common plane and establishing movement of said second axis through said first plane.

2. Lineal measuring apparatus according to claim 1, wherein said portion affixed to the frame is angularly adjustable in a plane parallel to said third plane to control parallelism between said axes.

3. Lineal measuring apparatus according to claim 1, including spring means reacting from an adjustable backstop on the frame and one of the four-bar links adapted to bias movement of the four-bar linkage in a direction tending to separate said rolls.

4. Lineal measuring apparatus according to claim 1, including spring means reacting from an adjustable backstop on the frame and one of the four-bar links adapted to bias movement of the four-bar linkage in a direction to separate said rolls, and wherein said portion affixed to the frame is angularly adjustable to control parallelism between said axes.

5. Lineal measuring apparatus comprising a frame, a measuring roll member and a backing member between which material may be passed for rotating the measuring roll member to measure the length of the material, and means for adjustably setting the axis of the measuring roll member parallel to the pass plane of said members, said means comprising a locating plate pivotally attached at one end thereof to the frame, a parallel four-bar linkage, said parallel four-bar linkage comprising an upper link pivotally supporting at one end thereof one of said members and pivotally mounted at the other end thereof on the locating plate at the end opposite the pivotally attached end of the locating plate, and a lower link pivotally supporting at one end thereof one of said members and pivitally mounted near the other end thereof on the frame, the pivot point of the lower link on the frame being the same as the pivot point of the locating plate, whereby the axis of the measuring roll member may be set parallel to the pass plane of said members upon pivoting the locating plate to the proper position.

6. Lineal measuring apparatus comprising a measuring roll and a backing roll between which material may be passed in contact for rotating the measuring roll, a counter, a drive connecting the measuring roll and the counter, a parallel-four-bar linkage supporting at one end thereof one of said rolls, said linkage being positioned to swing in a plane of action parallel to the axes of said rolls and to maintain said axes parallel in all relative positions of the rolls, an antispin device between the measuring roll and the counter comprising a ratchet connected in said drive, a friction clutch between the measuring roll and the drive adapted for driving therebetween when the ratchet is free but for slippage therebetween when the ratchet is locked, a pawl adapted in one position to lock the ratchet and in another to release it, and detector means controlling the pawl organized with the measuring roll and adapted when a length of material to be measured engages the measuring roll to move the pawl from ratchet-locking to ratchet-releasing position.

7. Lineal measuring apparatus comprising a frame, a first roll mounted thereon and rotatable about a first axis, a second roll rotatable about a second axis movable through parallel positions in a first plane including both axes, portions of said rolls being rotatable in a common second plane perpendicular to said first plane, a body carrying said second roll, a parallel-four-bar linkage supporting said body of which said body constitutes a first link and of which a portion affixed with respect to said frame constitutes a second and opposed link, a pair of opposed additional links connecting said first and second links, said linkage having relative movements of its links in a third plane perpendicular to said common plane and establishing movements of said second axis through its parallel positions in said first plane, drive means, and a counting mechanism driven by one of the rolls through said drive means.

8. Lineal measuring apparatus according to claim 7, including spring means reacting between and adjustable backstop on the frame and one of said additional links and adapted to bias movement of the four-bar linkage in a direction tending to separate said rolls.

9. Lineal measuring apparatus according to claim 7, wherein said portion affixed with respect to the frame is angularly adjustable in a plane parallel to said third plane to control parallelism between said axes.

10. Lineal measuring apparatus according to claim 7, wherein said portion affixed to the frame is angularly adjustable in a plane parallel to said third plane to control parallelism between said axes and including spring means reacting from an adjustable backstop on the frame and one of the four-bar links adapted to bias movement of the four-bar linkage in a direction tending to separate said rolls.

11. Lineal measuring apparatus according to claim 7, wherein the roll that drives the counting mechanism is said first roll, the counting mechanism being supported on the frame.

12. Lineal measuring apparatus according to claim 7, wherein the roll that drives the counting mechanism is said second roll, the counting mechanism being mounted upon said body which carries said second roll.

13. Lineal measuring apparatus according to claim 11, wherein said first roll has a hard peripheral surface and said second roll has a spongy peripheral surface.

14. Lineal measuring apparatus according to claim 11, including an antispin device between said first roll and the counting mechanism.

15. Lineal measuring apparatus according to claim 14, wherein said antispin device comprises ratchet means connected in said drive means, a friction clutch between the first roll and said drive means adapted for driving therebetween when the ratchet means is free but for slippage therebetween when the ratchet means is locked, a pawl adapted in one position to lock the ratchet means and in another to release the ratchet means, and detector means controlling the pawl, said detector means being positioned relative to the first roll so that when a length of material to be measured engages the first roll the detector means is moved thereby to drive the pawl from its ratchet-locking to its ratchet-releasing position.

16. Lineal measuring apparatus according to claim 15, wherein said detector means comprises a shaft on which the pawl is mounted, a detector finger carried by said shaft, said first roll having a peripheral groove for accepting the finger when material engages the first roll, said second roll containing a peripheral recess within its peripheral surface for accommodating outward movement of said finger from the groove in the first roll when no material is in position between rolls, and means biasing said finger from said groove in the first roll toward the recess in the second roll so as to engage said pawl with said ratchet to lock said drive means in the absence between the rolls of material to be measured.

17. Lineal measuring apparatus comprising a frame having a substantially horizontally extending base and an upright toward one end, a first roll mounted thereon toward its second end and rotatable about a first axis which extends in a general direction toward said upright, a second roll rotatable about a second axis movable through parallel positions in a first plane including both axes, portions of said rolls being rotatable in a common second plane perpendicular to said first plane to provide between the rolls a path of movement for material to be measured, said path being generally in a direction across said second end of the base, a body carrying said second roll, a parallel-four-bar linkage supporting said body of which said body constitutes a first link and of which a portion affixed with respect to said upright constitutes a second and opposed link, a pair of opposed additional upper and lower links connecting said first and second links, the plane of operation of said linkage extending from said upright toward the second roll and having relative movements of its links in a third plane perpendicular to said common plane and establishing movements of said second axis through its parallel positions in said first plane, the plane of movement of said parallel linkage being substantially perpendicular to said path of movement of the material, drive means, and a counting mechanism driven by one of said rolls through said drive means.

18. Lineal measuring apparatus according to claim 17, including an extension at the upright of said additional lower link of the four-bar linkage, a threaded adjustable backstop on said upright, and a compression spring located between said backstop and said last-named extension.

References Cited in the file of this patent

UNITED STATES PATENTS

| 52,378 | Benham | Feb. 6, 1866 |
| 73,273 | Willoughby | Jan. 14, 1868 |
| 316,887 | Frye | Apr. 28, 1885 |
| 1,105,217 | Stegmaier | July 28, 1914 |
| 1,379,159 | Baldwin | May 24, 1921 |
| 1,622,254 | Ritter | Mar. 22, 1927 |

FOREIGN PATENTS

| 720,597 | Great Britain | Dec. 22, 1954 |